Sept. 20, 1960 F. MANDUCA 2,952,931
EASY PICTURE CHANGE FRAME
Filed March 11, 1958 2 Sheets-Sheet 1
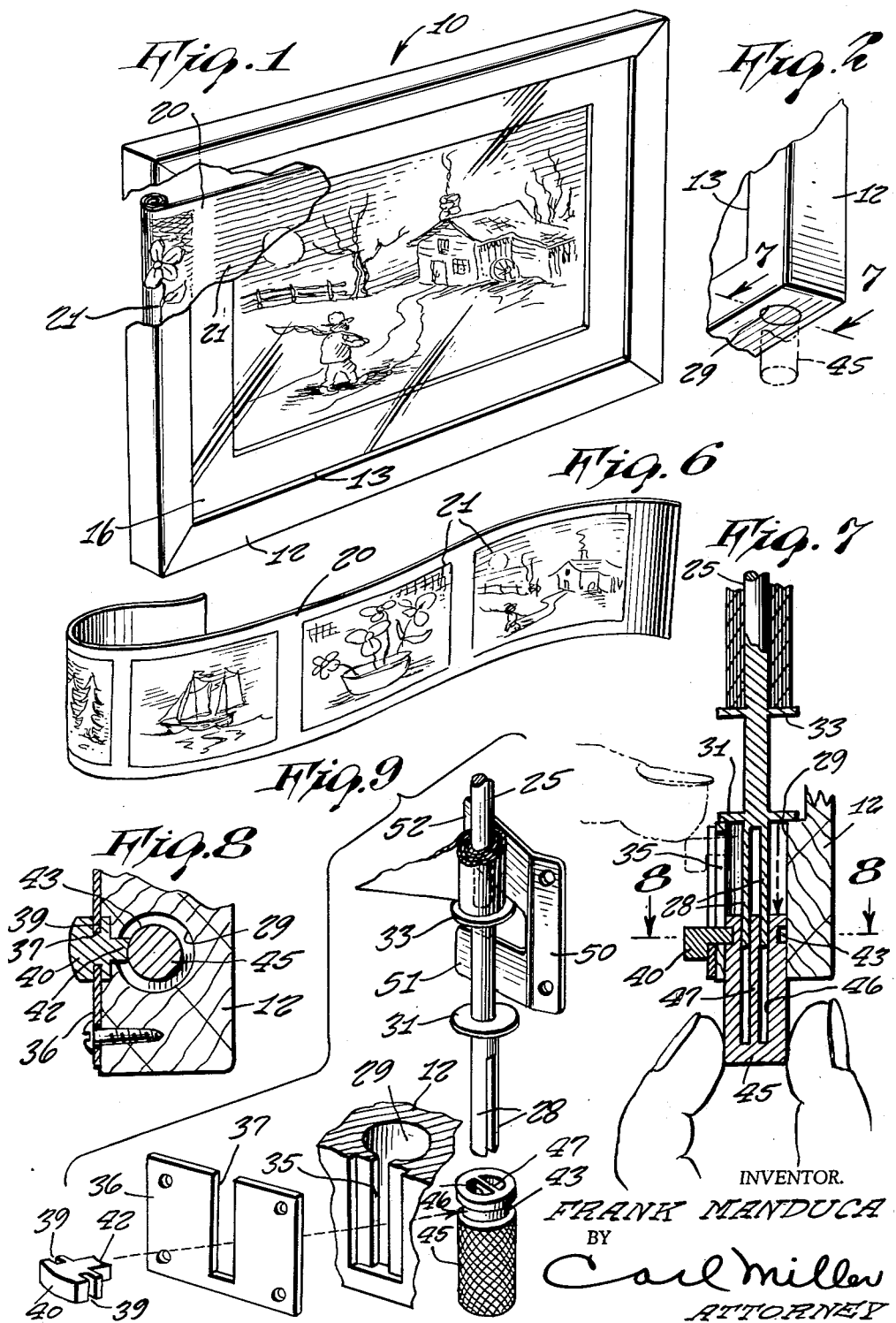
INVENTOR.
FRANK MANDUCA
BY
Carl Miller
ATTORNEY Sept. 20, 1960 F. MANDUCA 2,952,931
EASY PICTURE CHANGE FRAME
Filed March 11, 1958 2 Sheets-Sheet 2
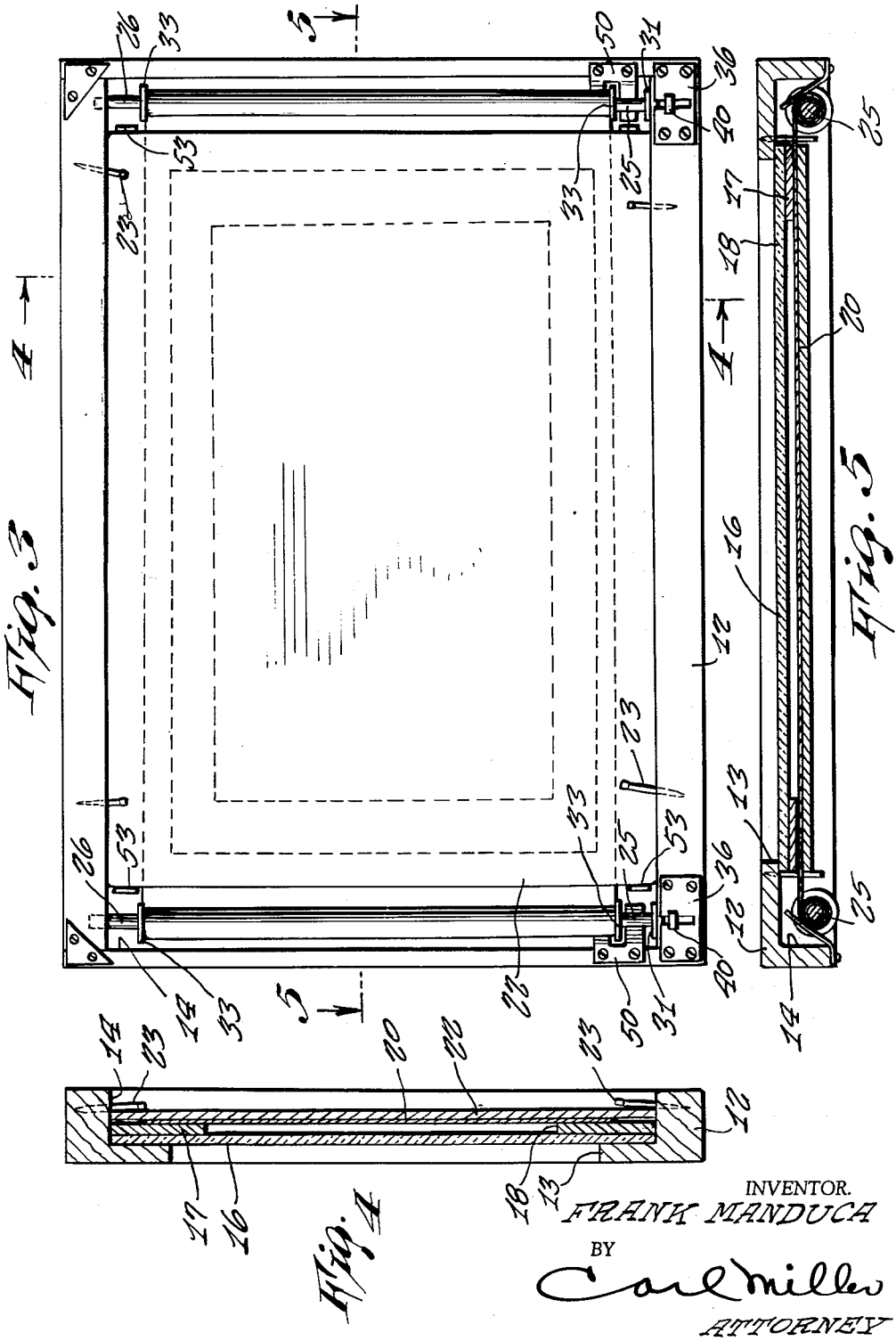
INVENTOR.
FRANK MANDUCA
BY
Carl Miller
ATTORNEY

United States Patent Office 2,952,931
Patented Sept. 20, 1960

2,952,931

EASY PICTURE CHANGE FRAME

Frank Manduca, 159 Withers St., Brooklyn 11, N.Y.

Filed Mar. 11, 1958, Ser. No. 720,702

1 Claim. (Cl. 40—86)

This invention relates to picture frames and, more particularly, to a novelty picture frame.

Ordinarily, the occupants of a home, office, or other unit become somewhat bored with looking at the same picture that is ordinarily supported within a picture frame and hung upon a wall. This is particularly true when the picture being displayed is distasteful to certain individuals, not proper for present circumstances, or for a particular holiday season. It is therefore an object of the present invention to provide a novel picture frame having self contained means for manually changing the picture displayed which will overcome the aforementioned difficulties and which will further enhance the appearance of any wall.

Another object of the present invention is to provide display apparatus in the form of a picture frame having a strip of diverse pictures that can be selectively changed to display any particular one of such pictures at any time.

Still a further object of the present invention is to provide a changeable picture display frame that is extremely simple in construction, efficient in operation, and which can be manufactured in large quantities at relatively low cost.

All of the foregoing and still further objects and advantages of this invention will become apparent from a study of the following specification, taken in connection with the accompanying drawing, wherein:

Figure 1 is a perspective view, with parts broken away, of a display picture frame made in accordance with the present invention;

Figure 2 is a fragmentary perspective view showing certain parts of the picture frame shown in Figure 1;

Figure 3 is a rear elevational view of the frame shown in Figure 1;

Figure 4 is a transverse cross sectional view taken along line 4—4 of Figure 3;

Figure 5 is a longitudinal cross sectional view taken along line 5—5 of Figure 3;

Figure 6 is a perspective view of a strip of pictures forming a part of the present invention;

Figure 7 is an enlarged fragmentary cross sectional view taken along line 7—7 of Figure 2;

Figure 8 is a transverse cross sectional view taken along line 8—8 of Figure 7; and Figure 9 is a fragmentary exploded perspective view of certain operating parts of the present invention.

Referring now to the drawing, a display picture frame 10 made in accordance with the present invention is shown to include a rectangular annular frame 12 having a central aperture 13 and having a rearwardly opening annular recess 14 at the rearmost side thereof.

A glass pane 16 is supported within the rearwardly opening recess 14, as is an annular matte or mask 17 which also has an aperture 18 at the center thereof. A strip 20 of different pictures 21, all of the same size and shape corresponding generally to the size and shape of the aperture 13 in the frame 12, is slidably supported between the matte 17 and the backing plate 22 for reciprocating longitudinal movement. This backing plate 22 is secured within the opening and all of the other elements associated therewith are similarly secured by means of tacks 23 which retain them in place.

A transversely extending roller 25 is rotatably supported adjacent each end of the frame 12, each such roller 25 having an upwardly extending pintle 26 rotatably supported upon the upper side of the frame and the opposite end thereof being bifurcated to provide a pair of spaced apart parallel legs 28. These legs 28 extend into an enlarged bore 29 at the lower side of the frame, while a radially outwardly extending flange 31 prevents the downward movement of the rollers into the bore.

Longitudinally spaced apart spacer flanges 33 are integral with each roller so as to provide a guide for the rolling up of each end of the strip 20 thereupon.

As is more clearly shown in Figure 9 of the drawing, the rearmost side of the frame 12 adjacent to each bore 29 is provided with a slot 35 that slidably receives a finger 42 of an actuator lug 40 that is supported for reciprocating vertical movement upon a plate 36 having a central vertical slot 37. The actuator lug 40 has grooves 39 at each side which receive the cutout defining portions of the plate 36 and which permit the finger 42 to extend therethrough and through the slot 35 of the frame, into engagement within the annular groove 43 at one end of a cylindrical handle member 45. This handle member is slidably received within each bore 29 of the frame for actuation in response to an upward or downward movement upon the actuator lug 40 that is accessible from the rear side of the frame.

The cylindrical handle member 45 is also provided with a central longitudinal bore 46 that is divided by a central partition wall 47. This will is slidably received within the space between the bifurcated legs 28 of each associated roller, whereby a positive rotation transmitting drive connection between the handle 45 and the roller 25 is provided. It will now be recognized that in response to a downward movement upon the actuated lug 40, the handle 45 will be extended outwardly from the frame so as to enable the operator to rotate the particular roller 25 to change the picture that is exposed to view in the frame. After the desired picture has been located, the handle 45 may be retracted by an upward movement of the actuator lug 40, whereby it is completely hidden from view.

A U-shaped spring plate 50 is also secured at each end of the frame with one leg 51 frictionally engaging the roller 25 intermediate the retaining flange 31 and lowermost spacer flange 33, while the other such leg 52 frictionally engages the lowermost edge of the roll of pictures on the strip 20, as is clearly shown in Figure 9. These spring biased legs 51 serve to frictionally resist rotation of the respective rollers so as to secure the proper picture in the centered position. In order to prevent the backing plate 22 from shifting during the rotation of the respective roller, a plurality of stops 53 are secured to the frame at each end of the backing plate, thus maintaining it in proper position at all times.

It will be recognized that all types of pictures may be conveniently displayed in this manner. One novel assembly would be to provide a strip 20 of pictures 21, in which each picture would depict a different season of the year so as to provide seasonal decoration in any home. Other strips could also be provided that would illustrate various types of holidays and festive occasions, to further enhance the appearance of the room.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

Picture display apparatus comprising, in combination, an annular frame defining a central aperture, said frame defining a rearwardly opening recess of slightly larger size than said central aperture, a transparent glass pane within said rearwardly opening recess, a backing sheet behind said pane, a strip of flexible material of substantially greater length than the width of said aperture slidably supported between said pane and said backing sheet for selective longitudinal movement relative to said frame, said strip having a plurality of longitudinally spaced apart diverse illustrations each of substantially the same size as said central aperture, a pair of rollers within said recess at each end of said frame, each end of said strip being rollably secured to one of said rollers, friction means comprising spring biased legs acting upon each one of said rollers yieldably resisting rotation thereof in both directions, and manual means for selectively rotating each one of said rollers, said frame defining a bore at each end concentric with one end of each said roller, said manual means comprising a cylindrical handle slidably supported upon said one end of each said roller in reciprocating longitudinal movement, and each said handle being slidably supported within said respective bore of said frame, further comprising slider means extending rearwardly from said frame for selectively moving each said handle between an exposed operating position, and a concealed position within said bore.

References Cited in the file of this patent

UNITED STATES PATENTS

| | | |
|---|---|---|
| 1,016,392 | Boudrot | Feb. 6, 1912 |
| 1,113,747 | Boyden | Oct. 13, 1914 |
| 1,868,580 | McKinney | July 26, 1932 |
| 2,260,785 | Miguel | Oct. 28, 1941 |
| 2,374,341 | Farrand | Apr. 24, 1945 |
| 2,497,019 | Shockey | Feb. 7, 1950 |